June 5, 1923

H. A. ADAMS

MOTOR METER

Filed Oct. 6, 1921

1,457,481

2 Sheets-Sheet 1

INVENTOR.
Harold A. Adams.
BY Hazard & Miller,
ATTORNEYS

June 5, 1923.

H. A. ADAMS

MOTOR METER

Filed Oct. 6, 1921

1,457,481

2 Sheets-Sheet 2

INVENTOR.
Harold A. Adams.
BY
Hazard & Miller
ATTORNEYS

Patented June 5, 1923.

UNITED STATES PATENT OFFICE.

HAROLD A. ADAMS, OF BAKERSFIELD, CALIFORNIA.

MOTOR METER.

Application filed October 6, 1921. Serial No. 505,741.

*To all whom it may concern:*

Be it known that I, HAROLD A. ADAMS, a citizen of the United States, residing at Bakersfield, in the county of Kern and State of California, have invented new and useful Improvements in Motor Meters, of which the following is a specification.

My invention relates to a motor meter, or device for indicating temperatures within the radiators of motor vehicles, the principal objects of my invention being to generally improve upon and simplify the construction of the existing types of similar devices, to provide a temperature indicating device of the character described that will be very accurate in its indications, quickly responsive to slight variations of temperature within the radiator to which the device is attached, and further to provide a temperature indicating device having movable parts and fixed graduations that may be readily noted from the driver's seat of the vehicle in darkness as well as daylight, so that the vehicle driver may at all times readily note the temperature conditions in the radiator of his vehicle.

Figure 1:
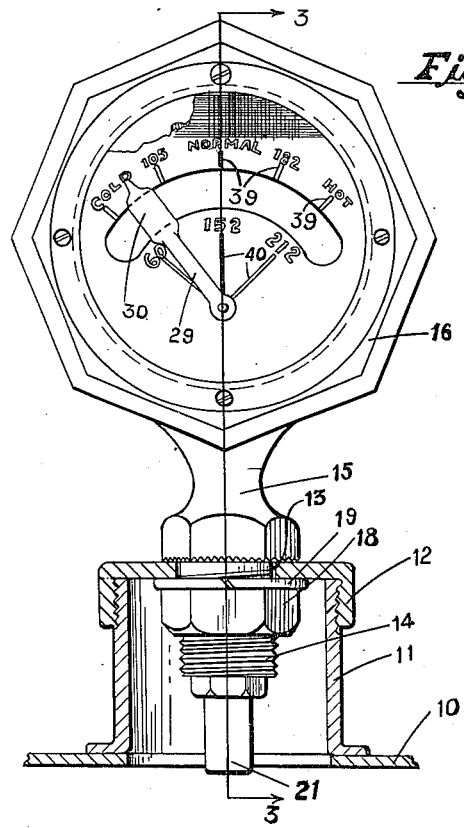

With the foregoing and other objects in view, my invention consists in certain novel features of construction and arrangement of parts that will be hereinafter more fully described and claimed and illustrated in the accompanying drawings, in which:

Fig. 1. is an elevational view of a temperature indicating device of my improved construction, and showing the face that is rearwardly disposed with respect to the front end of the vehicle to which the device is applied.

Figure 2:
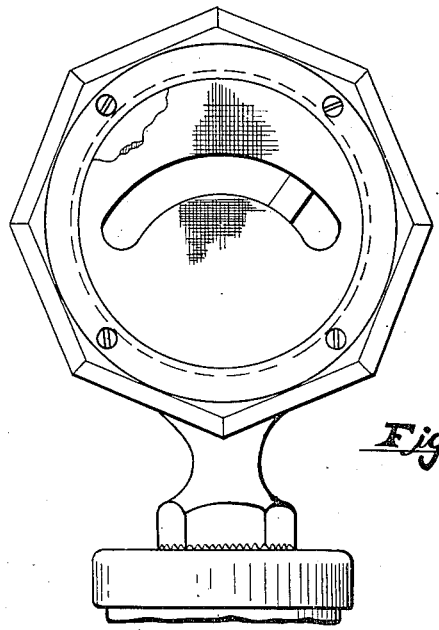

Fig. 2. is an elevational view of the temperature indicating device and showing the front face thereof.

Figure 3:
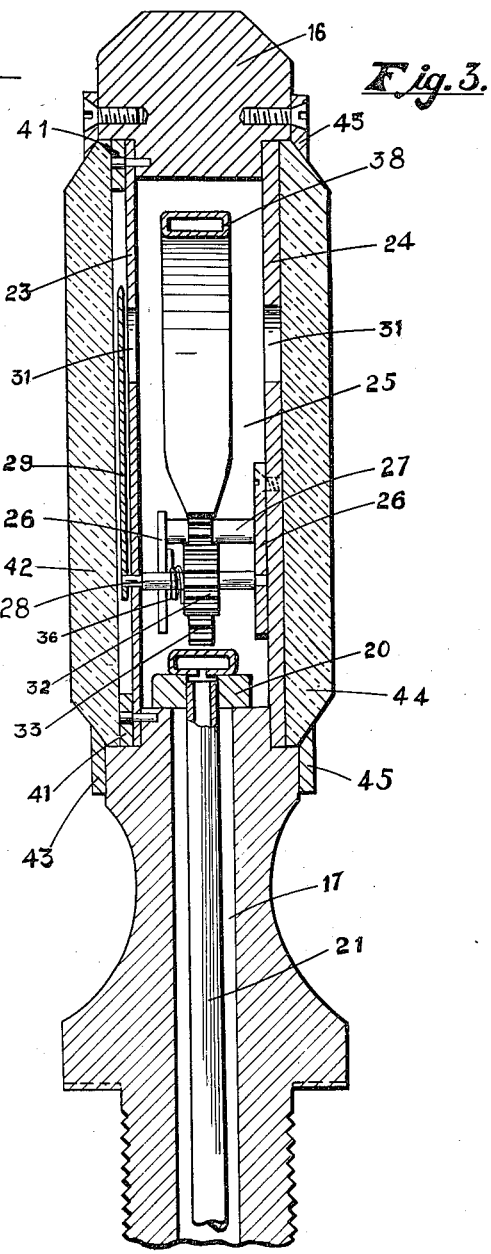

Fig. 3. is an enlarged vertical section taken on the line 3—3 of Fig. 1.

Figure 4:
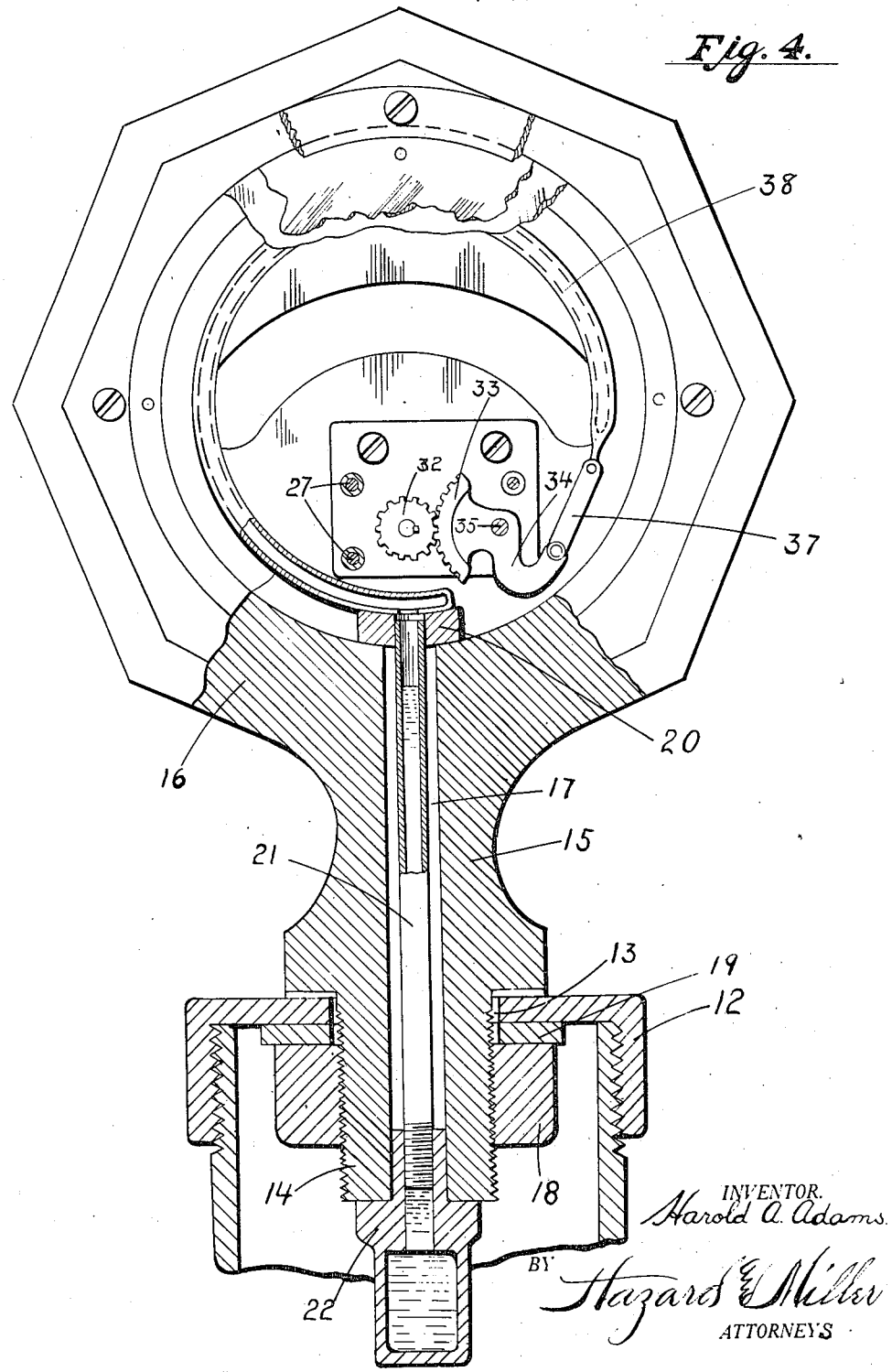

Fig. 4. is an enlarged elevational view of the device with parts thereof broken away and in vertical section.

Referring by numerals to the accompanying drawings which illustrate a practical embodiment of my invention, 10 designates the top portion of a motor vehicle radiator, 11 the short vertically disposed filling nipple that projects upwardly from the top of the radiator, and 12 a cap that is screw-seated on the upper end of said filling nipple, and which serves as a support for my improved temperature indicating device.

Formed through the center of cap 12 is an aperture 13, through which passes the externally threaded nipple 14 that is formed integral with and projects downwardly from a short tubular base member 15, the latter being formed integral with the lower portion of a ring 16, and which latter serves as the main frame or body of the device.

The opening 17 see Fig. 4 through the nipple 14 extends entirely through base portion 15, and through the lower portion of ring 16. The frame of the device thus constructed is detachably secured to the cap 12 by a nut 18 that is screw-seated upon the threaded nipple 14, said nut being positioned beneath the top of the cap and there being a washer 19 interposed between said nut and the under side of the top of said cap.

Seated against the inner face of the ring 16, directly over the upper end of the opening 17 is a block 20 in which is seated the upper end of a tube 21 that extends downwardly through opening 17, its lower end being screw-seated in the upper portion of a hollow member 22, and which latter is positioned directly below the lower end of nipple 14.

This hollow member 22 serves as a container for liquid that is readily expansible under rising temperatures, and the volume of this expansible liquid is such as to fill or partially fill the tube 21.

Secured to the inner edge of the ring 16, and slightly inset from its front and rear faces, are opaque disks 23 and 24, the same being spaced apart to form an intermediate chamber 25, and secured to the inner face of disk 24, and arranged in the lower portion of said chamber 25, is a frame work comprising a pair of plates 26 that are connected by a series of transversely disposed pins 27.

Journalled in suitable bearings formed in the plates 26, is a shaft 28, one end of which projects through a bearing in disk 23, and the end of said shaft outside said disk 23 is provided with a pointer 29 having a relatively wide outer portion 30, and the outer face of said pointer being preferably coated with luminous material.

Formed in the upper portions of disks 23 and 24, are arcuate slots 31 that are concentric with the axis of shaft 28, and the relatively wide portion 30 of the pointer 29 is positioned immediately in front of arcuate slot 31 that is formed in the disk 23, said wide portion extending entirely across said slot.

Fixed on shaft 28 is a pinion 32 that meshes with the teeth of a segment 33 which latter is formed integral with one end of a bell crank 34, the latter being fulcrumed on a pin 35 that is seated in plates 26 to one side of shaft 28.

One end of a spiral spring 36 is secured to one of the plates 26, the coils of said spring passing around shaft 28, and the opposite end of said spring being fixed to pinion 32, said spring being for the purpose of taking up any lost motion that may occur as a result of wear between the teeth of pinion 32 and segment 33, and consequently maintaining a firm bearing between said parts and eliminating vibration of pointer 29.

Pivotally connected to the outer end of bell crank 34 is a short link 37, the upper end of which is pivotally connected to one end of a Bourdon tube 38 that is positioned in chamber 25, and the opposite or lower end of said tube being secured to block 20, the chamber within the tube having direct communication with the chamber in tube 21 that is filled or partially filled with the expansible fluid.

Located on the outer face of disk 23, immediately above the arcuate slot 31 therein, is a series of indicating marks or graduations 39 that are preferably spaced at equal distances apart, and said marks being preferably formed of luminous material.

Appearing on the face of the disk 23 adjacent to certain of said marks, are legends such as "Cold, Normal, and Hot," and appearing adjacent to other marks of the graduated scale, are numbers that are intended to indicate different degrees of temperature.

Appearing on the outer face of disk 23, below the arcuate slot therein is a series of equally spaced marks 40, adjacent to which appear numbers that are intended to designate different degrees of temperature.

Arranged on the outer face of disk 23 adjacent to the edge thereof, is a spacing ring 41, and positioned thereon is the edge of a disk 42 of glass or the like, and which latter is secured to ring 16 by a retaining ring 43, the inner edge of which overlies the outer edge of the glass disk.

Arranged directly against the outer face of the disk 24 is a disk 44 of glass or the like, and which is secured in position upon ring 16 by a retaining ring 45, the inner edge of which overlies the marginal edge of said glass disk.

When my improved temperature indicating device is applied for use, the cap 12 is screw-seated on the upper end of nipple 11, and when so positioned the container 22 projects a slight distance downwardly into the upper portion of the water space in the top of the radiator, at which point the highest temperatures in the cooling system associated with the engine are produced.

While the engine and the cooling system associated therewith are "cold," the Bourdon tube 38 in contracted condition, maintains bell crank 34 in position, so that pointer 29 that is fixed to shaft 28, carrying the pinion 32 that meshes with segment 33, maintains a position adjacent to the left hand end of the slot 31 and disk 23, and adjacent to the graduated mark 30 that bears the legend "Cold."

After the engine has been started, and the temperature of the water in the cooling system associated with said engine gradually increases, the fluid within container 22 and tube 21 will gradually expand, thereby causing the Bourdon tube 38 to correspondingly expand, and as a result, bell crank 34 will be swung upon its fulcrum, thereby moving segment 33 so as to impart rotary motion to pinion 32 and shaft 28, and as said shaft is thus rotated, the pointer 29 will be slowly moved over the face of disk 23, and the position of said pointer with respect to the graduated marks 39 and 40 will gradually indicate the temperature conditions within the upper portion of the radiator to which the device is applied.

Inasmuch as pointer 29 is provided with a relatively wide portion that lies immediately in front of the arcuate slot 31 in disk 23, the position of said pointer may be readily noted from a considerable distance away from the device, and this condition is particularly desired as it enables the driver of a vehicle, from his position in the vehicle, to readily note, at any time, the temperature conditions within the radiator.

The arcuate openings 31 which are in alignment with each other, provide a "window" or sight opening through the device, and the wide portion of the pointer lying across this sight opening, is at all times readily discernible from the driver's seat in the vehicle.

Inasmuch as the pointer 29, and the graduations 39 and 40 are coated with luminous paint, the device may be readily observed, and temperature conditions within the radiator noted at night.

The under side of base portion 15 is provided with teeth 15ª which, when the device is secured to the cap 12, engage in the surface thereof thereby preventing the instrument fom turning out of position when the cap is applied to the radiator, and also preventing the instrument from turning when grasped by the hand during the removal or replacement of the cap.

At night my improved motor meter is thrown into relief by the glow from the headlights, thereby permitting light to pass through the arcuate slots 31, and the broad black line lying across the illuminated arcuate slots is readily visible for a considerable distance away from the instrument and consequently enabling the vehicle driver to note the temperature conditions in the radiator from his position on the vehicle seat.

Thus it will be seen that I have produced a temperature indicating device that is of relatively simple structure, capable of being easily and cheaply produced, and very effective in performing its intended functions.

While I have described my invention with respect to the specific details of structure herein shown, it is obvious that the same may be altered in many ways without departing fom the spirit and scope of my invention as herein claimed.

I claim as my invention:

1. In a motor meter, the combination of a frame with an opening therethrough, opposed disks arranged in the opening, said disks being provided with coinciding arcuate slots producing a sight opening through the frame, a pivotally mounted pointer having its axis coincident with the axes of the arcuate slots, said pointer having a relatively wide portion that overlies said slots and extends entirely across them, and temperature responsive means for imparting movement to said pointer.

2. In a motor meter, the combination of a frame with an opening therethrough, opposed disks arranged in the opening forming a housing, said disks being provided with coinciding arcuate slots producing a sight opening through the frame, a pivotally mounted pointer having its axis coincident with the axes of the arcuate slots, said pointer being mounted outside of said housing and covered with luminous paint and having a relatively wide portion that overlies said slots and extends entirely across them, temperature responsive means for imparting movement to said pointer, and temperature indicating marks arranged on one of the disks adjacent to the arcuate slots therein.

3. In a motor meter, the combination of a frame provided with an opening therethrough, opposing disks arranged in the opening, said disks provided with coinciding slots for producing a sight opening through the frame, a shaft supported by the disks, a pointer mounted on the shaft and extending across the slots of the disks and temperature responsive means for imparting movement to said shaft for operating the pointer.

4. In a motor meter, the combination of a frame provided with an opening, opposed disks arranged in the opening and provided with coinciding slots for producing a sight opening through the frame, a shaft supported by the disks, a pointer mounted on the shaft and extending across the slots of the disks, a Bourdon tube located between the disks and connected to the shaft for rotating the shaft, and an expansive fluid container connected to the Bourdon tube.

5. In a motor meter, the combination of a frame provided with an opening, opposed disks arranged in the opening and provided with coinciding slots for producing a sight opening through the frame, a shaft supported by the disks and projecting through one of the disks, a pointer mounted on the projecting end of the shaft and lying alongside of the disk, said pointer extending across the slots of the disks and adapted to move there along, and temperature responsive means for imparting movement to said shaft for operating the pointer.

6. In a motor meter, a tubular base member provided on its under surface with teeth adapted to engage the cap of a filling nipple, means cooperating with said toothed surface to secure said base member to said cap, a ring integral with said base member and serving as the main frame of said motor meter, opaque plates secured to said ring at opposite sides thereof to form therebetween a chamber for a Bourdon tube and operating parts connected therewith, both of said plates being provided with arcuate slots opposite one another, glass plates corresponding in size and shape to said opaque plates and being secured to said ring externally of said opaque plates.

7. In a motor meter, a tubular base member provided on its under surface with teeth adapted to engage the cap of a filling nipple, means cooperating with said toothed surface to secure said base member to said cap, a ring integral with said base member and serving as the main frame of said motor meter, opaque plates secured to said ring at opposite sides thereof to form therebetween a chamber for a Bourdon tube and operating parts connected therewith, both of said plates being provided with arcuate slots opposite one another, glass plates corresponding in size and shape to said opaque plates and being located externally of said opaque plates, one of said glass plates being spaced from the corresponding opaque plate, and said opaque plate being provided with an aperture, a shaft extending through said aperture and communicating with said operating parts, and an indicating pointer on said shaft and between said opaque plate and said glass plate, said pointer being covered by a luminous paint and provided with an expanded end extending completely across said slots.

In testimony whereof I have signed my name to this specification.

HAROLD A. ADAMS.